United States Patent
Borthakur et al.

(10) Patent No.: US 7,103,638 B1
(45) Date of Patent: Sep. 5, 2006

(54) MECHANISM TO RE-EXPORT NFS CLIENT MOUNT POINTS FROM NODES IN A CLUSTER

(75) Inventors: Dhrubajyoti Borthakur, San Jose, CA (US); John Colgrove, Los Altos, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 831 days.

(21) Appl. No.: 10/235,022

(22) Filed: Sep. 4, 2002

(51) Int. Cl.
*G06F 15/167* (2006.01)
*G06F 12/00* (2006.01)
(52) U.S. Cl. .................. 709/213; 707/205; 711/148
(58) Field of Classification Search ............. None
See application file for complete search history.

(56) References Cited

U.S. PATENT DOCUMENTS 5,603,019 A * 2/1997 Kish ................. 707/205
2001/0051955 A1* 12/2001 Wong ............... 707/201
2002/0156984 A1* 10/2002 Padovano ........... 711/148
2003/0177107 A1* 9/2003 Brown et al. ......... 707/1

* cited by examiner

*Primary Examiner*—Wen-Tai Lin
(74) *Attorney, Agent, or Firm*—Robert C. Kowert; Meyertons, Hood, Kivlin, Kowert & Goetzel, P.C.

(57) ABSTRACT

Mechanism for re-exporting Network File System (NFS) mount points. In one embodiment, a first server may send a file handle lookup request for a file in a file system to a second server that imported the file system from a third server and re-exported the file system to the second server. The second server may access a file handle mapping mechanism to generate a file handle for the file on the second server. The first server may send an I/O request including the file handle to the second server. The second server may access the file handle mapping mechanism to generate a file handle for the file on the third server from the file handle received in the I/O request. The second server forwards the I/O request to the third server using the new file handle. Results of the request are forwarded to the first server by the second server.

30 Claims, 9 Drawing Sheets

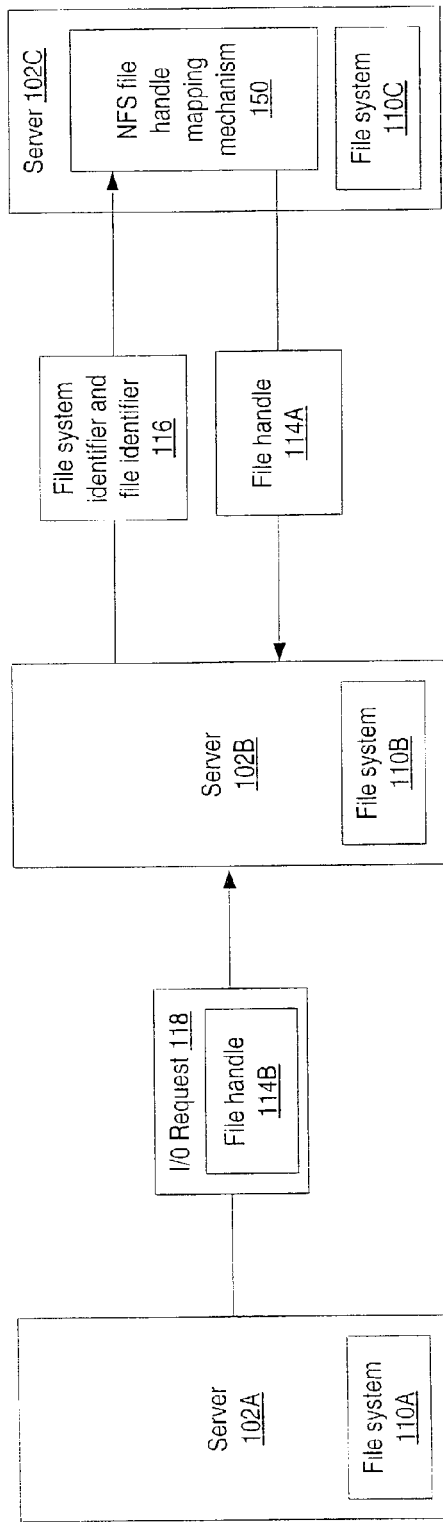
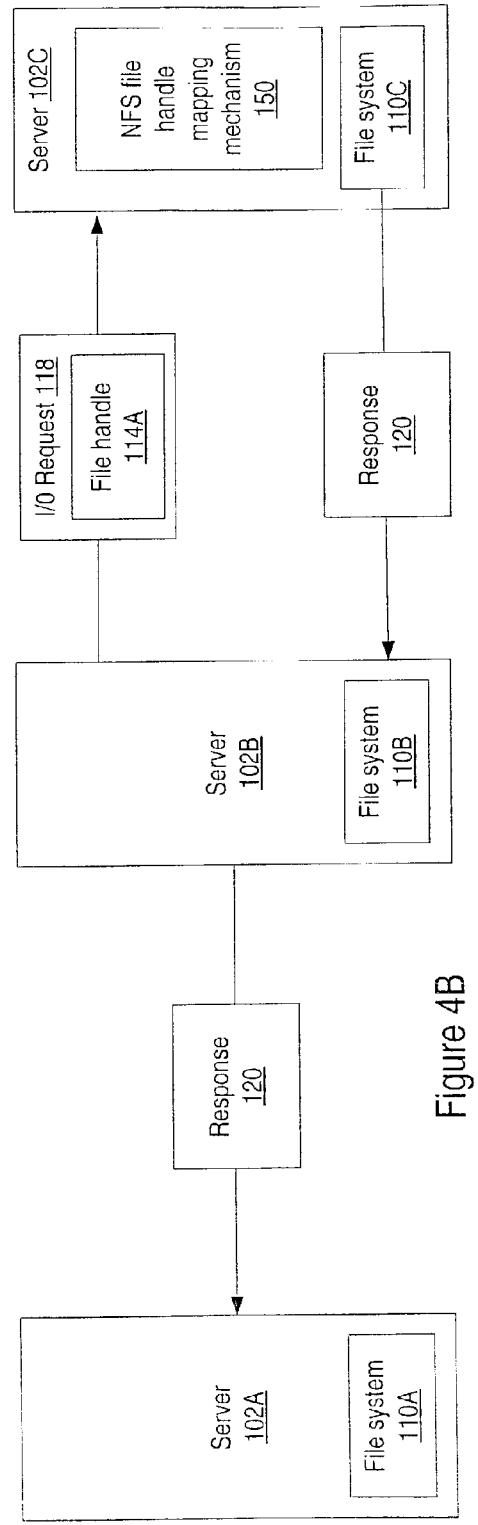
Figure 4A
Figure 4B

MECHANISM TO RE-EXPORT NFS CLIENT MOUNT POINTS FROM NODES IN A CLUSTER

BACKGROUND OF THE INVENTION

1. Field of the Invention

This invention is related to the field of storage management and, more particularly, to software used in storage management.

2. Description of the Related Art

The Network File System (NFS) is a client/server application that lets a computer user view and optionally store and update files on a remote computer as though the files were on the user's own computer. The user's system needs to have an NFS client and the other computer needs an NFS server. NFS was developed by Sun Microsystems and has been designated a file server standard. The NFS protocol provides transparent remote access to shared files across networks. The NFS protocol is designed to be portable across different machines, operating systems, network architectures, and transport protocols. Implementations of NFS exist for a variety of machines, from personal computers to supercomputers.

NFS defines the way in which files are named and where they are placed logically for storage and retrieval. In NFS, a file is placed in a directory (folder in Windows) or subdirectory at the desired place in the tree structure. NFS also specifies conventions for naming files. These conventions may include one or more of, but are not limited to, the maximum number of characters in a name, which characters can be used, and, in some systems, how long the file name suffix can be. NFS also defines a format for specifying the path to a file through the structure of directories.

Using NFS, the user or a system administrator may mount a portion or all of the files available in the NFS file system. The mounted files may be accessed with whatever privileges are associated with the access to each file (e.g. read-only and read-write). The mounted files are logically organized in a file system. A file system is a tree on a single server with a specified root. NFS assumes a file system that is hierarchical, with directories as all but the bottom level of files. Each entry in a file system (file, directory, device, etc.) has a string name. Different operating systems may have restrictions on the depth of the tree or the names used, as well as using different syntax to represent the "pathname," which is the concatenation of all the "components" (directory and file names) in the name.

A mount point is a position or node in a directory tree on a server at which a file system is mounted. Mount points on a server may be exported to other systems (e.g. servers). When a file system at a mount point on a server is exported to another system, the file system is mounted at a mount point in the importing system.

The NFS protocol uses file handles to uniquely identify files. An NFS server constructs a file handle using the file system identifier (fsid) and the file identifier (fileid) exported by the local file system. The local file system may guarantee that the file system identifier uniquely identifies a file system on that machine, and may guarantee that the file identifier uniquely identifies a file on the specified file system. Thus, the NFS server may guarantee that the file handle uniquely identifies a file on that server. In addition to the file system identifier and file identifier, the file handle may also include export information about the NFS server mount point. NFS supports a lookup procedure for converting file names into file handles.

A MOUNT protocol allows a server to hand out remote access privileges to a restricted set of clients. The mount protocol performs the operating system-specific functions that allow, for example, the attachment of remote directory trees to local file systems. The MOUNT protocol may be used to initiate client access to a server supporting the Network File System (NFS) application. The MOUNT protocol handles local operating system specifics such as path name format and user authentication. Clients desiring access to the NFS program may use the MOUNT protocol to obtain a file handle suitable for use with NFS.

Clustering

Clustering may be defined as the use of multiple computers, for example PCs or UNIX workstations, multiple storage devices, and redundant interconnections, to form what appears to users as a single highly available system. Clustering may be used for load balancing, and parallel processing as well as for high availability. To the outside world, the cluster appears to be a single system. A cluster may be defined as a group of servers and other resources that act like a single system and enable high availability and, in some cases, load balancing and parallel processing.

A common use of clustering is to load balance traffic on high-traffic Web sites. A Web page request is sent to a "manager" server, which then determines which of several identical or similar Web servers to forward the request to for handling. Having a Web farm (as such a configuration is sometimes called) allows traffic to be handled more quickly.

Storage Area Networks

The storage area network (SAN) model places storage on its own dedicated network, removing data storage from the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

The versatility of the SAN model enables organizations to perform tasks that were previously difficult to implement, such as LAN-free and server-free tape backup, storage leasing, and fill-motion video services. SAN deployment promises numerous advantages, including cost management through storage consolidation, higher availability of data, better performance and seamless management of online and offline data. In addition, the LAN is relieved of the overhead of disk access and tape backup, data availability becomes less server-dependent, and downtime incurred by service and maintenance tasks affects more granular portions of the available storage system.

SAN-Aware File Systems and NFS

SAN-aware file systems may use NFS (Network File System) internally for accessing file system metadata while directing the data traffic directly to the storage over the SAN. An example is the Sanergy file system from IBM Tivoli. This type of clustering solution may be used as a parallel NFS file server only with the capacity to re-export a mount point from any cluster node. This requires the ability to re-export an NFS client mount point from any node in a SAN cluster.

Current NFS implementations do not allow an NFS client (which may be an NFS server) to re-export a file system that it has imported from another NFS server. This limitation is imposed because the file handle defined by the NFS protocol is generally large enough to include information for one server only. For example, a first server may export a file system to be mounted on a second server using the NFS protocol. If the second server then re-exports the same file system to a third server, the file handles obtained from the first server cannot be used by the third server because they might match other file handles on the second server. A prefix added to the first server's file handles by the second server may be used to uniquely identify the file handles, but this generally cannot be done within the constraints of the file handle size limitations. The second server may issue its own file handles that correspond to those from the first server, but this would require a file handle mapping table that would need to persist across reboots of the second server.

Re-exporting a file system may also cause problems for security systems based on server access lists. In the above example, the first server may limit access to the second server, but cannot prevent access from the third server through the second server.

SUMMARY OF THE INVENTION

Embodiments of a mechanism that allows a Network File System (NFS) mount point to be re-exported using the NFS protocol. For one embodiment, SAN may be described as a high-speed, special-purpose network that interconnects one or more storage devices with one or more associated host systems or servers on behalf of a larger network of users. This dedicated network may employ Fibre Channel technology. Client systems may access the SAN by accessing one or more of the servers via a network. In one embodiment, a SAN-aware file system may use the Network File System (NFS) protocol in providing access to shared files on the SAN. Using NFS, each server may include a logical hierarchy of files (i.e. a directory tree) physically stored on one or more of storage devices and accessible by the client systems through the server. These hierarchies of files, or portions or sub-trees of the hierarchies of files, may be referred to herein as "file systems."

In one embodiment, the SAN components may be organized into one or more clusters to provide high availability, load balancing and/or parallel processing. In one embodiment, servers in the cluster are in the same security domain. Thus, the servers may have the same set of users and their associated user identifiers, thus ensuring that re-exporting an NFS mount point from a server that imported the NFS mount point from another server does not subvert NFS security mechanisms based on server access lists. In one embodiment, a SAN-aware cluster volume manager may provide a unique device identifier for each volume storage device in the cluster, which in turn results in a unique file system identifier for each file system in that cluster. In one embodiment, local file systems may generate the file system identifier using the volume storage device identifier returned by the SAN-aware cluster volume manager. Thus, a local file system created on a shared volume may generate different file system identifiers when mounted on different nodes (e.g. servers) in the same cluster. In one embodiment, an NFS file handle mapping mechanism may be provided on one or more servers in the cluster to map NFS file handles to file system identifiers and file identifiers of the server file system, and to map file system identifiers and file identifiers to NFS file handles.

In one embodiment, a cluster may include a first server, a second server, and a third server. The third server may export a file system to be mounted on the second server using the NFS protocol. The second server then may re-export the file system to the first server using the NFS protocol. To access a file in the file system re-exported from the second server, the first server uses an NFS file handle corresponding to the desired file. To obtain the NFS file handle, the first server sends a file handle lookup request to the second server. The second server may forward the file handle lookup request for the desired file to the third server. In response to the file handle lookup request, the third server returns an NFS file handle to the desired file on the third server. The second server then may send the NFS file handle to an NFS file handle mapping mechanism to map the NFS file handle to the file system identifier and file identifier of the file. In one embodiment, the NFS file handle mapping mechanism may reside on the third server. In another embodiment, the file handle mapping mechanism may reside on another server, for example the second server. The second server then may use the file system identifier and file identifier to generate an NFS file handle for the file in the file system on the second server. The second server then may send the NFS file handle for the file in the file system on the second server to the first server to satisfy the original file handle lookup request.

The first server then may send an I/O request to the second server including the NFS file handle received from the second server. The second server extracts the file system identifier and file identifier from the NFS file handle and sends them to the NFS file handle mapping mechanism (in one embodiment, on the third server) to map the file system identifier and file identifier to a file handle for the file on the third server. The second server then sends the I/O request, now including the file handle for the file on the third server, to the third server. If there is any response to the I/O request (e.g. to fulfill a Read I/O request), the third server sends the response to the second server, which forwards the response to the first server to meet the original I/O request received from the first server.

BRIEF DESCRIPTION OF THE DRAWINGS

The following detailed description makes reference to the accompanying drawings, which are now briefly described.

FIG. 4A illustrates generating a file handle for a file in an exported file system in response to an I/O request including a file handle for the file in a re-exported file system according to one embodiment.

FIG. 4B illustrates fulfilling the I/O request by forwarding the I/O request including the file handle for the file in the exported file system generated in FIG. 4A to the original exporting server according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
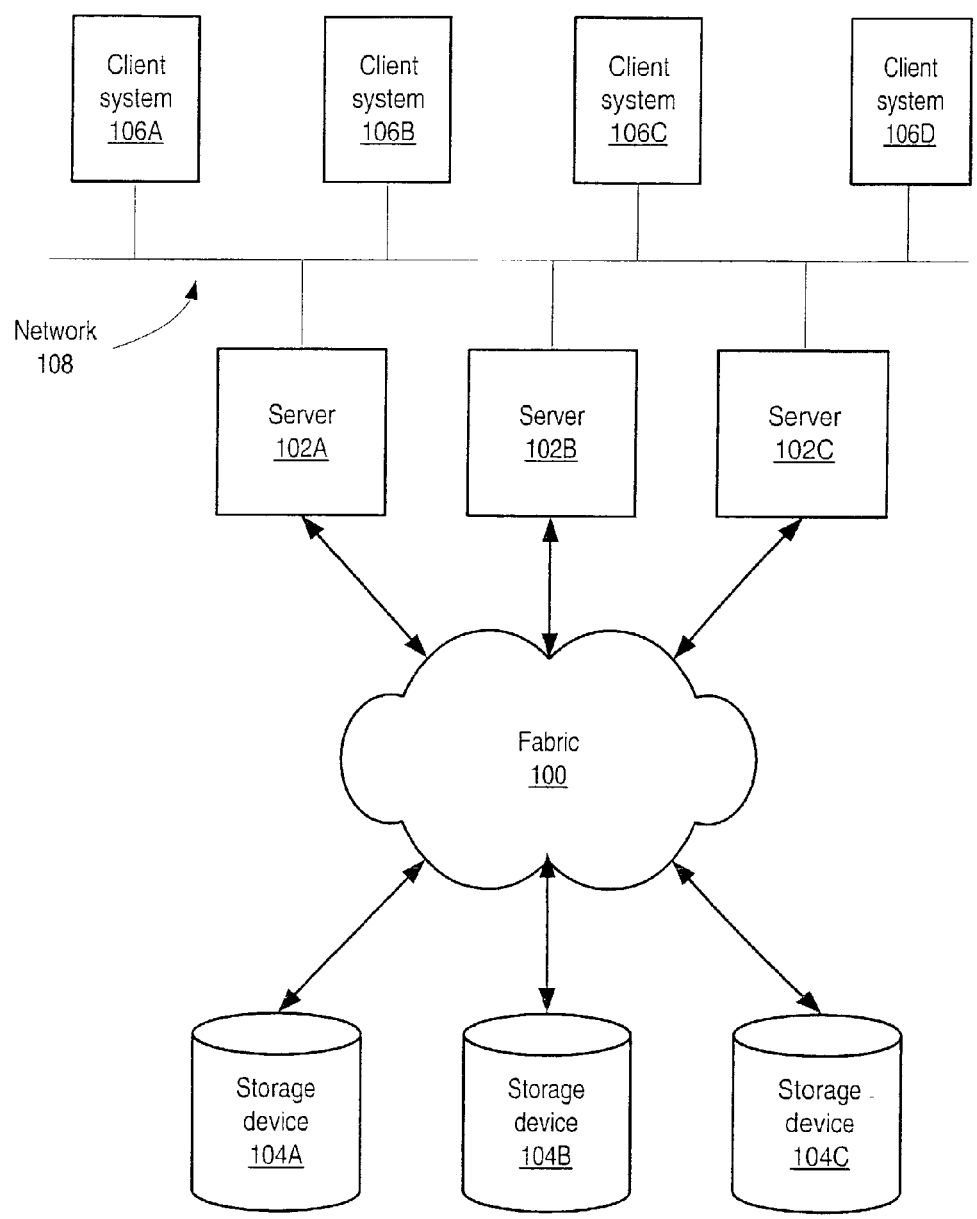
FIG. 1 illustrates an exemplary Storage Area Network (SAN) environment in which embodiments of the NFS mount point re-export mechanism may be implemented.

Embodiments of a mechanism that allows a Network File System (NFS) mount point to be re-exported using the NFS protocol. FIG. 1 illustrates an exemplary Storage Area Network (SAN) environment in which embodiments of the NFS mount point re-export mechanism may be implemented. For one embodiment, SAN may be described as a high-speed, special-purpose network that interconnects one or more storage devices 104 (e.g. storage devices 104A, 104B, and 104C) with one or more associated host systems or servers 102 (e.g. servers 102A, 102B, and 102C) on behalf of a larger network of users. This dedicated network may employ Fibre Channel technology. A SAN may be part of the overall network of computing resources for an enterprise or other entity. The one or more servers 102 (e.g. servers 102A, 102B, and 102C) and one or more storage devices 104 (e.g. storage devices 104A, 104B, and 104C) may be coupled via a fabric 100. One or more client systems 106 may access the SAN by accessing one or more of the servers 102 via a network 108. Network 108 may include wired or wireless communications connections separate from the Fibre Channel network, e.g. an Ethernet, LAN, WAN, or modem, among others.

Storage devices may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Servers 102 may run any of a variety of operating systems, including, but not limited to, Solaris 2.6, 7 or 8, Microsoft Windows NT 4.0 (Server and Enterprise Server), and Microsoft Windows 2000 (Server, Advanced Server and Datacenter Editions). Each server 102 may be connected to the fabric 100 via one or more Host Bus Adapters (HBAs).

The hardware that connects servers 102 to storage devices 104 in a SAN may be referred to as a fabric 100. The SAN fabric 100 enables server-to-storage device connectivity through Fibre Channel switching technology. The SAN fabric 100 hardware may include one or more switches (also referred to as fabric switches), bridges, hubs, or other devices such as routers, as well as the interconnecting cables (for Fibre Channel SANs, fibre optic cables). SAN fabric 100 may include one or more distinct device interconnection structures (e.g. Fibre Channel Arbitrated Loops, Fibre Channel Fabrics, etc.) that collectively form the SAN fabric 100.

In one embodiment, a SAN-aware file system may use the Network File System (NFS) protocol in providing access to shared files on the SAN. Using NFS, each server 102 may include a logical hierarchy of files (i.e. a directory tree) physically stored on one or more of storage devices 104 and accessible by the client systems 106 through the server 102. These hierarchies of files, or portions or sub-trees of the hierarchies of files, may be referred to herein as "file systems." In one embodiment, the SAN components may be organized into one or more clusters to provide high availability, load balancing and/or parallel processing. For example, in FIG. 1, servers 102A, 102B and 102C may be in a cluster.

Figure 2A:
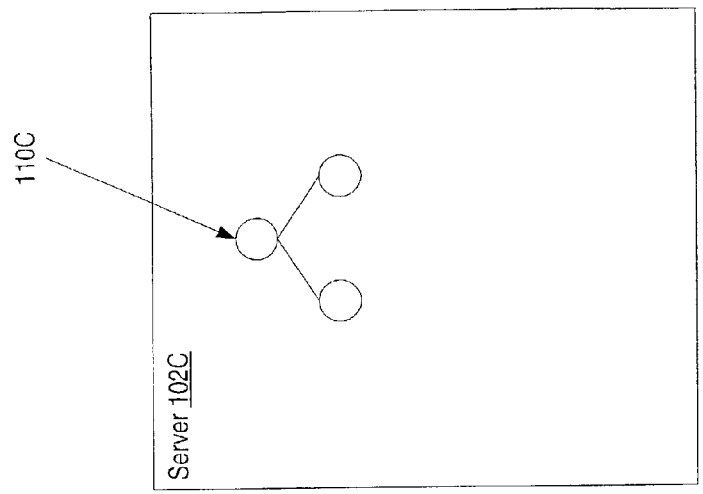
FIG. 2A illustrates servers in a SAN including directory trees of files from storage devices that the servers make available for access by client systems or other servers acting as clients according to one embodiment.
Figure 2A:
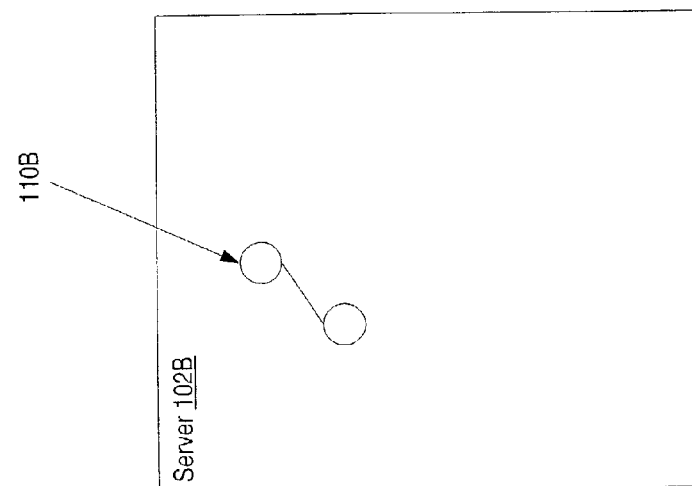
Figure 2A:
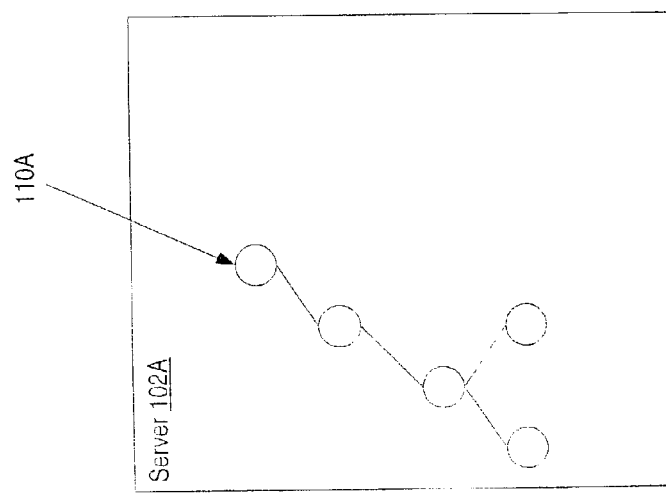
Figure 2B:
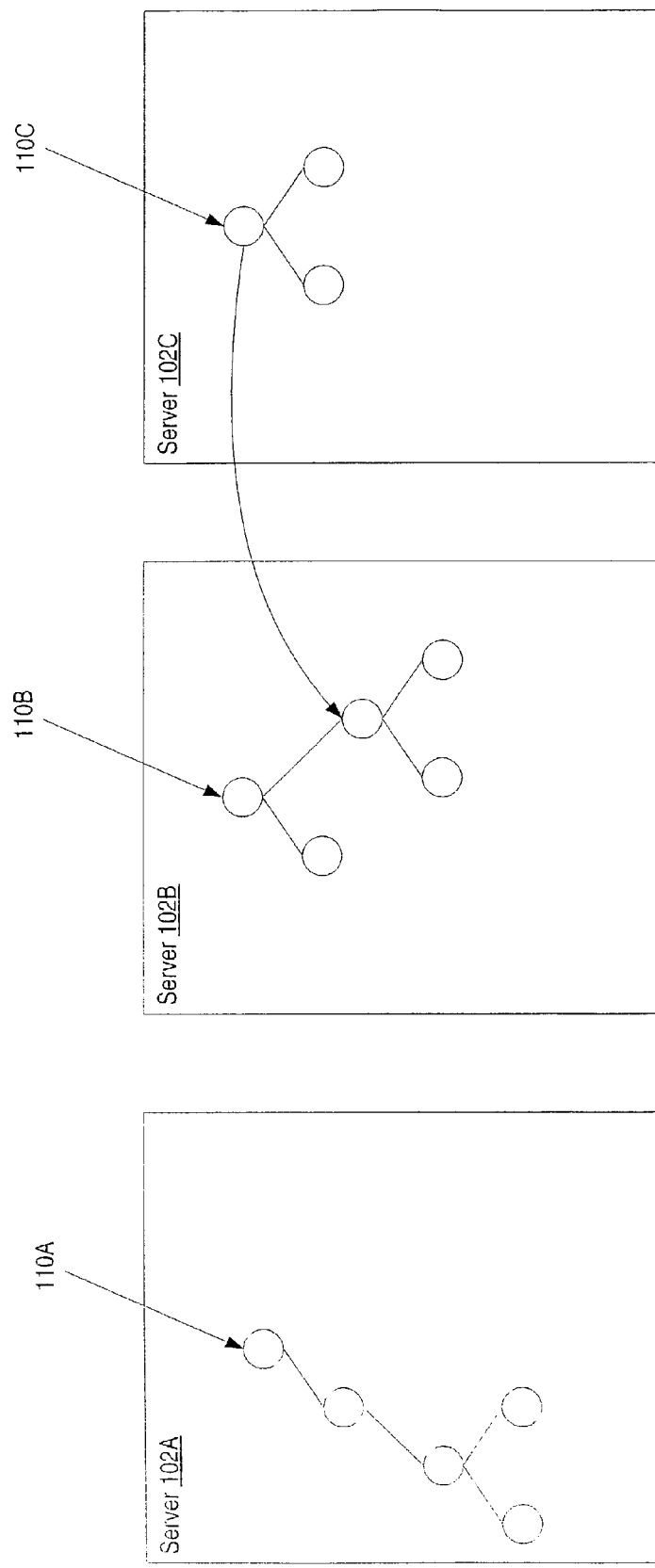
FIG. 2B illustrates a server exporting a file system to be mounted on another server using the NFS protocol according to one embodiment.
Figure 2C:
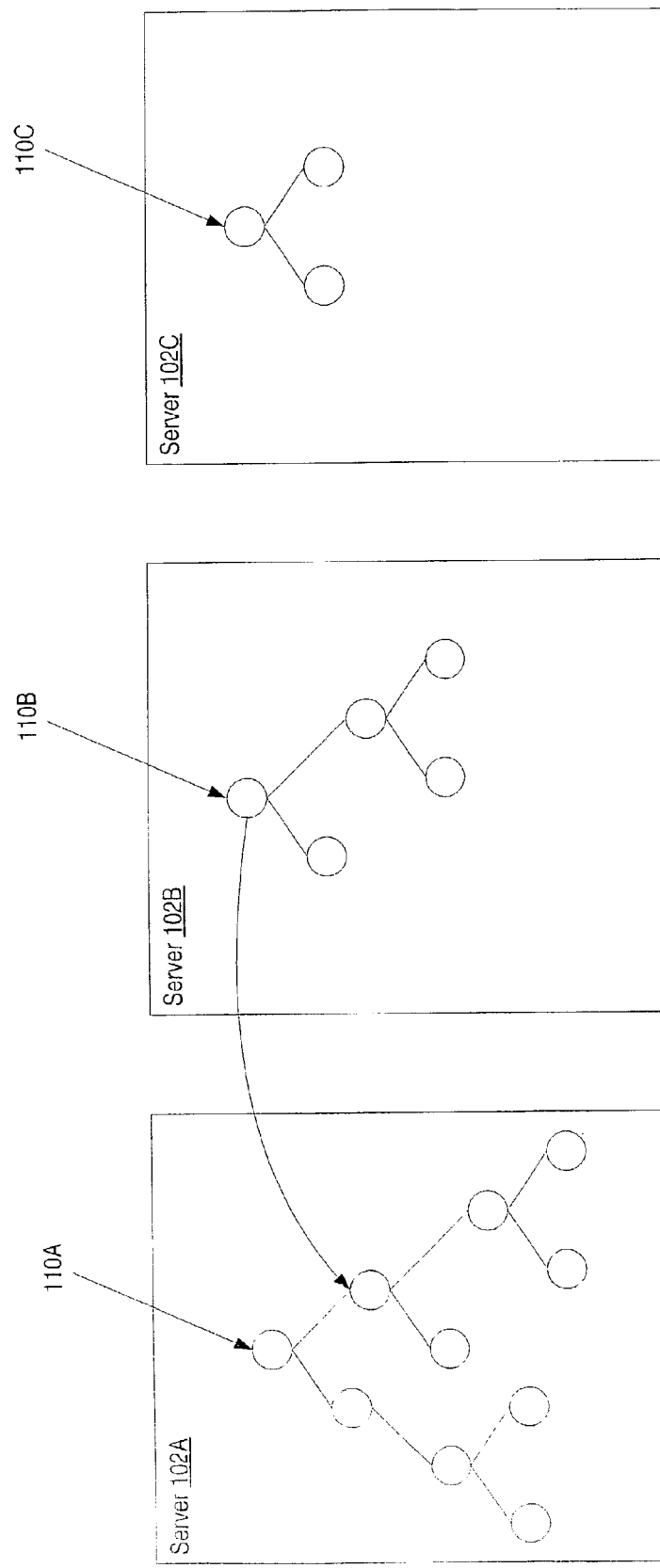
FIG. 2C illustrates a server re-exporting a file system to another server according to one embodiment.

FIGS. 2A through 2C illustrate using an embodiment of the NFS mount point re-export mechanism to re-export mount points of file systems according to one embodiment. FIG. 2A illustrates servers in a SAN including directory trees (i.e. file systems) of files from storage devices that the servers make available for access by client systems or other servers acting as clients. In one embodiment, servers 102A, 102B and 102C are in the same security domain. In one embodiment, a SAN-aware cluster volume manager may provide a unique device identifier for each volume storage device in the cluster, which in turn results in a unique file system identifier for each file system in that cluster. A SAN-aware cluster volume manager may enable multiple servers to have simultaneous read/write access to the same set of logical volumes. In one embodiment, an NFS file handle mapping mechanism may be provided on an NFS system in the cluster to map NFS file handles to file system identifiers and file identifiers of the server file system, and to map file system identifiers and file identifiers to NFS file handles. In one embodiment, each server 102 in a cluster that exports and re-exports file systems may include an instance of the NFS file handle mapping mechanism for mapping NFS file handles to corresponding file system identifiers and file identifiers and vice versa for files in the particular server's file system 110.

In one embodiment, the device identifier returned by a SAN-aware cluster volume manager uniquely identifies a volume and node in the cluster on which it is mounted. In one embodiment, local file systems may generate the file system identifier using the device identifier returned by the SAN-aware cluster volume manager. Thus, a local file system created on a shared volume may generate different file system identifiers when mounted on different nodes (e.g. servers) in the same cluster.

As illustrated in FIG. 2B, server 102C may export 130 a file system 110C to be mounted on server 102B using the NFS protocol. Note that the highest node in the file system being exported may also be referred to as a mount point, and thus exporting a file system may also be referred to as exporting a mount point. As illustrated in FIG. 2C, server 102B then may re-export 132 file system 110C to server 102A using the NFS protocol, as part of file system 110B if file system 110B is exported to server 102A or alternatively on its own. From server 102A's perspective, all of the files mounted from file system 110B, including the files in file system 110C, reside on server 102B.

At some point, server 102A may desire to access a file in a file system exported or re-exported from server 102B. For example, a client of server 102A may initiate an access of a file in file system 110A that has been exported or re-exported from server 102B. To access a file mounted from server 102B, server 102A uses an NFS file handle corresponding to the desired file. To obtain an NFS file handle, server 102A sends a file handle lookup request to server 102B. A file handle lookup request may include, but is not limited to, a file name of the desired file and a directory name of a directory where the desired file is located in the directory tree. If the desired file is not in a file system 110 re-exported from another server 102 such as server 102C, server 102B sends a file handle to the desired file to server 102A. Server 102A may then use the file handle to access the file from server 102B.

If the desired file is in a file system 110 imported from another server 102 and re-exported to server 102A, for example file system 110C, server 102B may send a file handle lookup request for the desired file to the server that exported the file system, in this example server 102C. In response to the file handle lookup request, server 102C returns an NFS file handle to the desired file on server 102C to server 102B. Server 102B then may send the NFS file handle to an NFS file handle mapping mechanism on server 102C to map the NFS file handle to the file system identifier and file identifier of the file. In one embodiment, the NFS file handle mapping mechanism may reside on server 102C. In another embodiment, the file handle mapping mechanism may reside on another server, for example server 102B. Server 102B then may use the file system identifier and file identifier to generate an NFS file handle for the file in the file system 110B on server 102B. Server 102B then may send the NFS file handle to server 102A to satisfy the original file handle lookup request.

Server 102A may then use the NFS file handle from server 102B to access the corresponding file using I/O requests to perform file operations on the file. File operations may include, but are not limited to, reading, writing, deleting, renaming, changing file ownership, etc. An I/O request may include the file handle for the file to access and other information for performing the desired operation. For example, a Read P/O request may include the file handle, an offset into the file, a length for the read, and a destination address or buffer of the read.

As mentioned, server 102A is not aware that file systems re-exported from server 102B actually reside on other servers. From server 102A's perspective, the files in the re-exported file systems reside in the file system on server 102B. To access a file in a file system re-exported from server 102B such as a file in file system 110C, server 102A sends an I/O request to server 102B including an NFS file handle for the file on server 102B generated by a process such as that described above. Server 102B extracts the file system identifier and file identifier from the NFS file handle and sends them to the NFS file handle mapping mechanism (in one embodiment, on server 102C) to map the file system identifier and file identifier to a file handle. Server 102B then replaces the file handle in the I/O request received from server 102A with the new file handle received from the file handle mapping mechanism and sends the I/O request to server 102C. From server 102C's perspective, the I/O request comes from server 102B and not server 102A. If there is any response to the I/O request (e.g. to fulfill a Read I/O request), server 102A sends the response to server 102B, which then forwards the response to server 102A to meet the original I/O request received from server 102A.

Because the NFS file handle mapping mechanism provides an API to convert file handles to corresponding file system identifiers and file identifiers and vice versa, in one embodiment, server 102B does not need to persistently keep the mappings from file handles to corresponding file system identifiers and file identifiers.

As mentioned, re-exporting a file system may cause problems for security systems based on server access lists. Since servers 102A, 102B and 102C are in the same security domain, servers 102A, 102B and 102C may have the same set of users and their associated user identifiers (user IDs). This ensures that re-exporting an NFS mount point from server 102B to server 102A does not subvert NFS security mechanisms based on server access lists.

Note that while FIGS. 2A–2C illustrate exporting and re-exporting entire directory trees (file systems), in one embodiment portions of directory trees may also be exported and re-exported. For example, in FIG. 2C, only the portion of directory tree 110B including (at and below the mount point of) the imported file system 110C may be re-exported to server 102A.

Figure 3A:
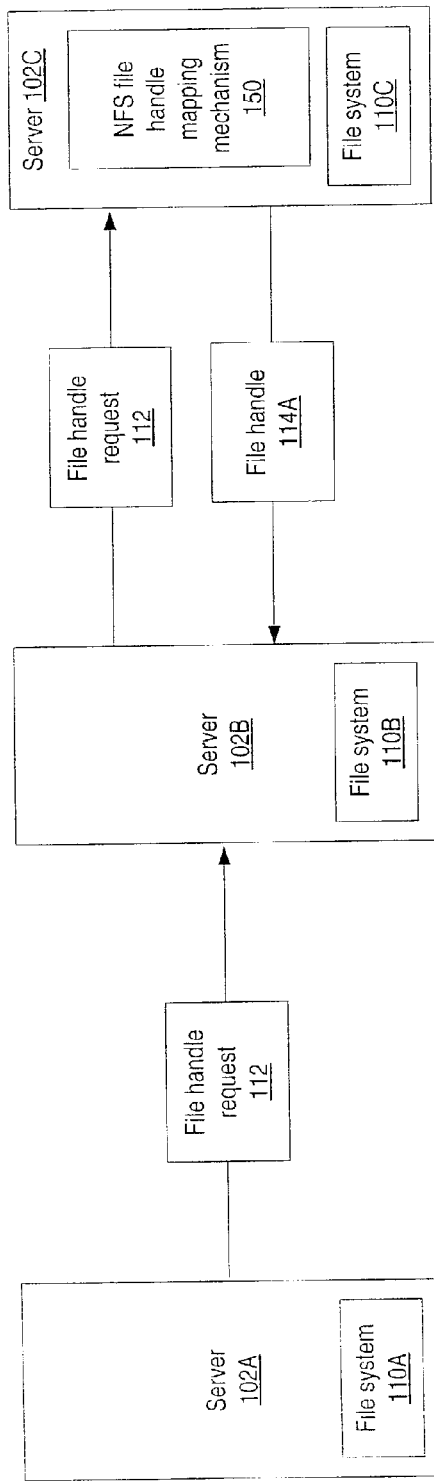
FIG. 3A illustrates generating a file handle for a file in an exported file system in response to a file handle lookup request according to one embodiment.
Figure 3B:
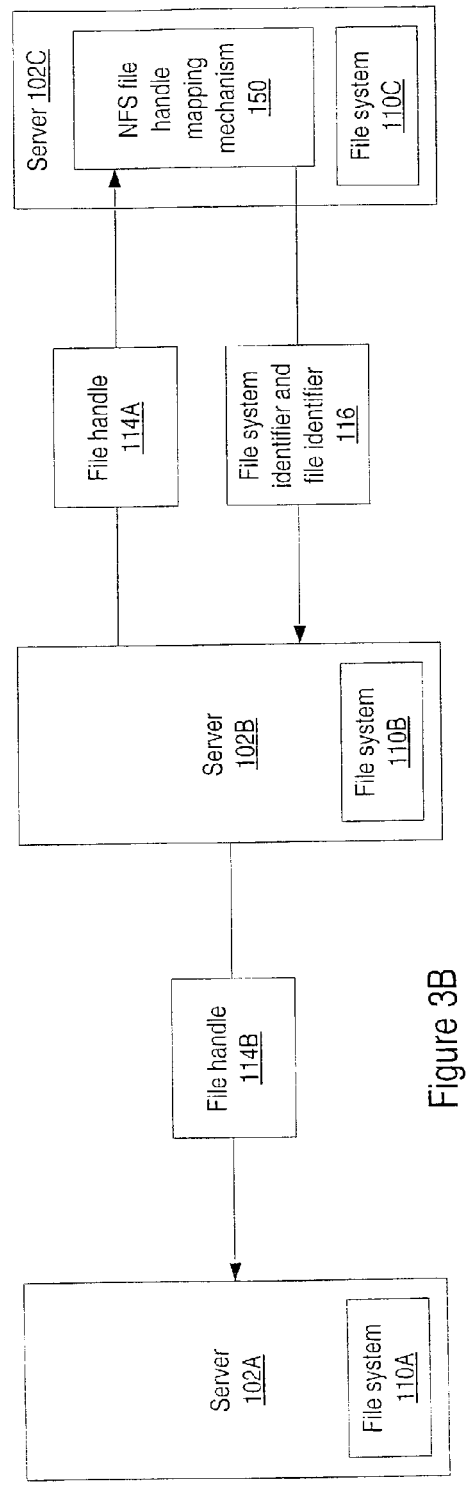
FIG. 3B illustrates generating a file handle for the file in a re-exported file system from the file handle generated in FIG. 3A to fulfill the file handle lookup request according to one embodiment.

FIGS. 3A and 3B illustrate a mechanism for generating NFS file handles for a re-exported file system according to one embodiment. In one embodiment, the mechanism described in FIGS. 3A and 3B may be performed, for example, when a client of server 102A desires to access a file in file system 110C re-exported from server 102B. In FIG. 3A, server 102A may send an NFS file handle lookup request 112 for a file in file system 110C to server 102B. In one embodiment, file handle lookup request 112 may specify the filename and directory of a file, for example a file that a client of server 102A desires to access. Server 102B may forward the file handle lookup request 112 to server 102C. Server 102C may process the file handle lookup request 112 to generate and return an NFS file handle 114A corresponding to the file in file system 110C.

In FIG. 3B, after receiving file handle 114A, server 102B then may access the NFS file handle mapping mechanism 150 to convert file handle 114A to its corresponding file system identifier and file identifier 116. Server 102B then may generate file handle 114B from the file system identifier and file identifier 116. Server 102B then may send the file handle 114B to server 102A to satisfy the file handle lookup request received in FIG. 3A. Because the file system identifier and file identifier 116, and not server 102C's file handle 114A, is used to generate file handle 114B, the size of file handle 114B generated by server 102B for export to server 102A is within the NFS file handle size limits.

FIGS. 4A and 4B illustrate accessing files in a re-exported file system according to one embodiment. As illustrated in FIG. 4A, server 102A may send to server 102B an NFS I/O request 118 which includes file handle 114B corresponding to a file in file system 110C of server 102C. Server 102B may extract the corresponding file system identifier and file identifier 116 from file handle 114B, and then access the NFS file handle mapping mechanism 150 on server 102C to convert the file system identifier and file identifier 116 to file handle 114A for the file. Server 102C then may send file handle 114A to server 102B.

As illustrated in FIG. 4B, after receiving file handle 114A, server 102B may forward the I/O request 118, now including file handle 114A, to server 102C. Server 102C may then access file 120 as specified by file handle 114A from SAN storage mounted in file system 110C to satisfy the I/O request 118. In one embodiment, as shown, server 102C may send a response 120, if any, (e.g. a portion of file specified by a Read I/O request) to server 102A via server 102B.

Figure 5:
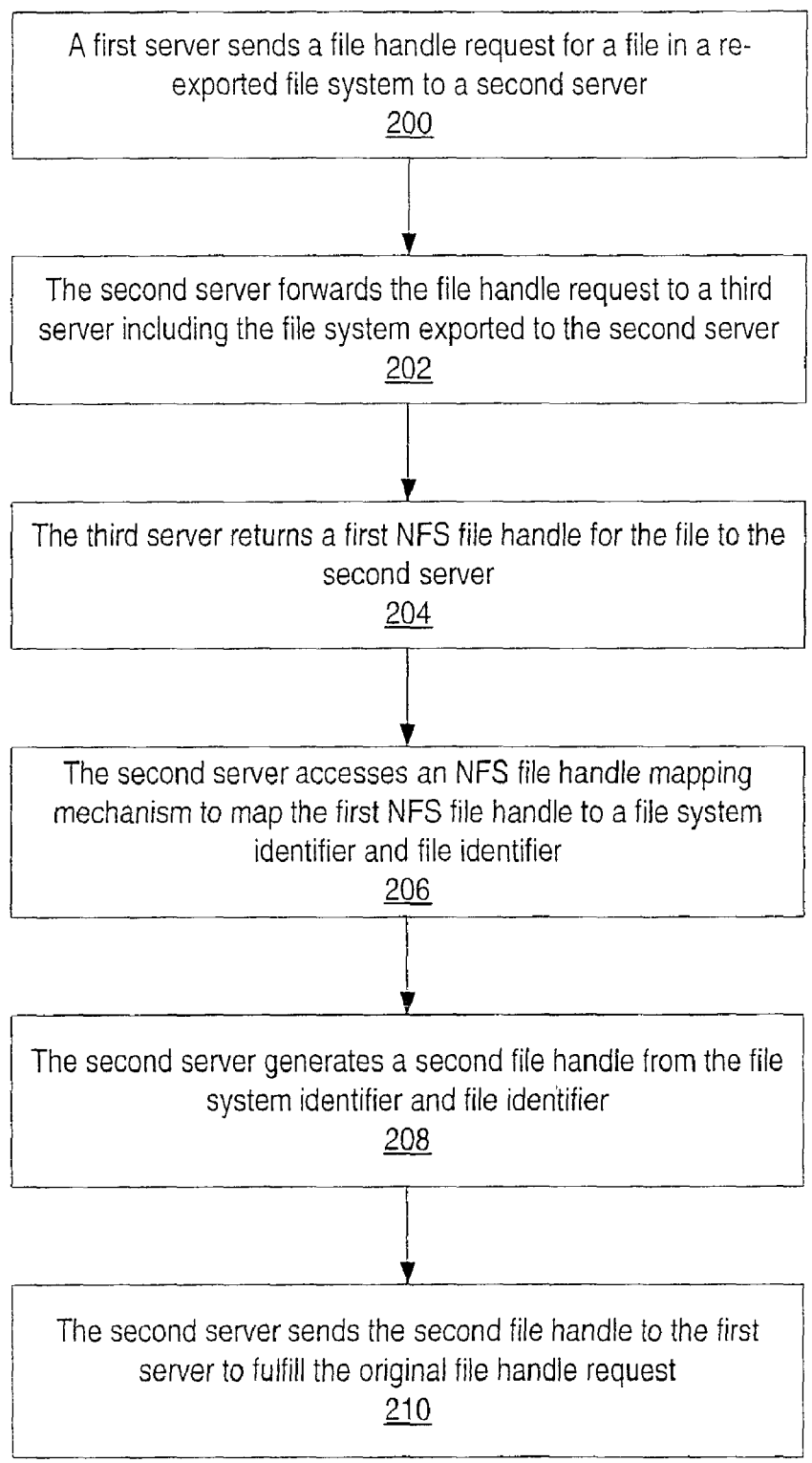
FIG. 5 illustrates a method of generating an NFS file handle for a re-exported File system according to one embodiment.

FIG. 5 illustrates a method of generating an NFS file handle for a re-exported file system according to one embodiment. A first server may have a file system mounted that has been re-exported from a second server. As indicated at 200, to access a file in the re-exported file system, for example to fulfill an access of the file from a client of the first server, the first server may send a file handle lookup request for the file in the re-exported file system to the second server. As indicated at 202, the second server forwards the file handle lookup request to a third server including the file system exported to the second server and re-exported to the first server. The third server returns a first NFS file handle for the file to the second server as indicated at 204. As indicated at 206, the second server accesses an NFS file handle mapping mechanism to map the first NFS file handle to a file system identifier and file identifier corresponding to the file. In one embodiment, the NFS file handle mapping mechanism is included in the third server. After receiving the file system identifier and file identifier from the NFS file handle mapping mechanism, the second server generates a second file handle from the file system identifier and file identifier as indicated at 208. The second server sends the second file handle to the first server to fulfill the original file handle lookup request as indicated at 210.

Figure 6:
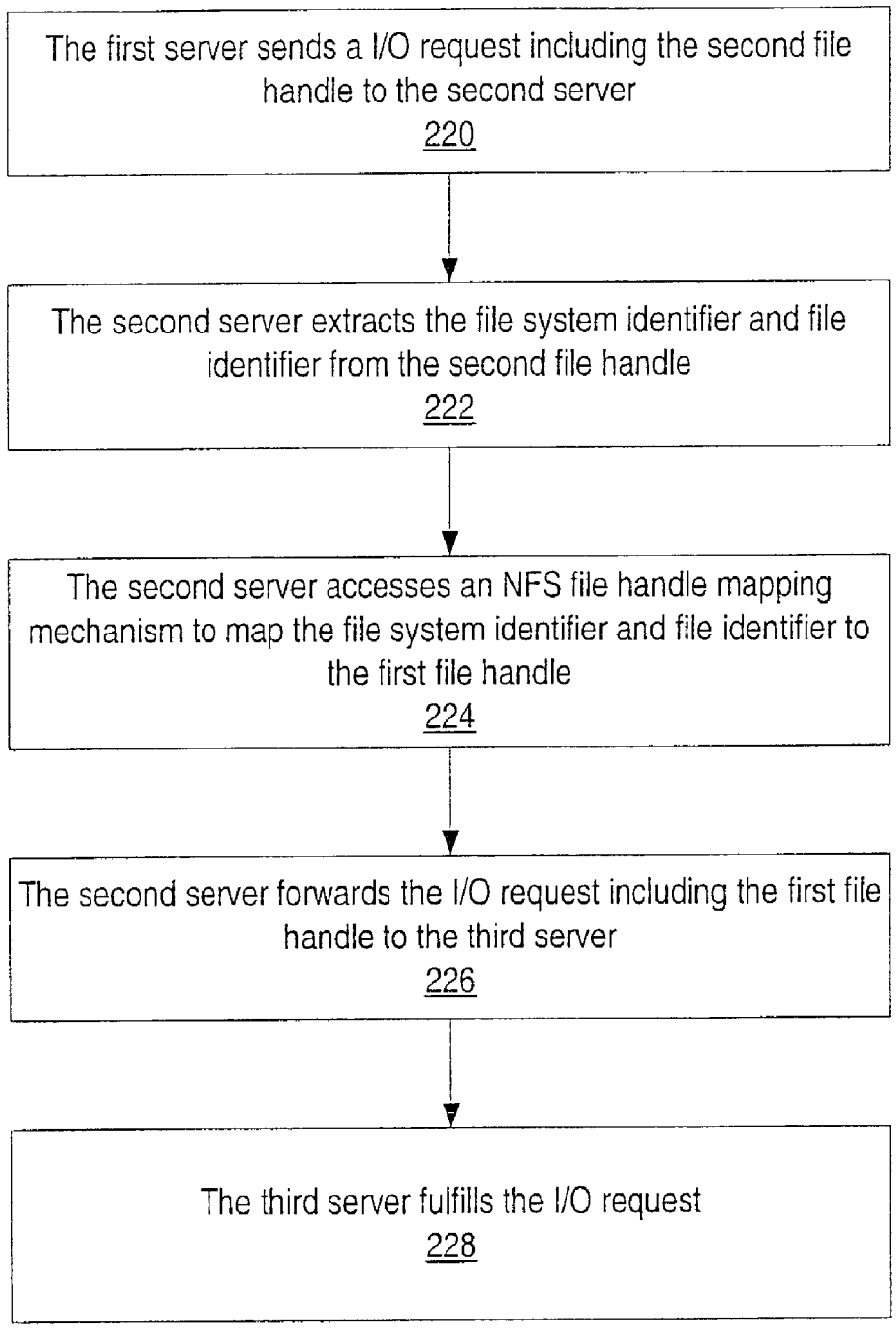
FIG. 6 illustrates a method of accessing files in a re-exported File system according to one embodiment.

FIG. 6 illustrates a method of accessing files in a re-exported File system according to one embodiment. After requesting and receiving the second file handle as described in FIG. 5, to perform operations on the file corresponding to the second file handle, the first server sends I/O requests including the second file handle to the second server, as the first server may not be aware that the file system including the file resides on the third server and has been re-exported by the second server. As indicated at 220, the first server sends an I/O request including the second file handle to the second server. The second server extracts the file system identifier and file identifier from the second file handle as indicated at 222. As indicated at 224, the second server accesses the NFS file handle mapping mechanism to map the file system identifier and file identifier to the first file handle. The second server then forwards an I/O request including the first file handle to the third server as indicated at 226. In one embodiment, the second server may replace the second file handle with the first file handle in the original I/O request. In another embodiment, the second server may generate a new I/O request including the first file handle. As indicated at 228, the third server then fulfills the I/O request. If there is any information to be returned in response to the I/O requests, e.g. to fulfill a Read I/O request, the third server sends the response to the second server, which then forwards the response to the first server to fulfill the original I/O request.

While embodiments of the mechanism for re-exporting mount points (i.e. file systems) in a cluster using the NFS protocol are described herein in regards to SAN network environments, it is noted that embodiments may be implemented in other network systems and environments which use the NFS protocol. Further, embodiments may be used in other file sharing protocols than the NFS protocol.

While FIG. 1 illustrates typical SAN architecture in which embodiments of the mechanism for re-exporting mount points in a cluster using the NFS protocol may be implemented, embodiments may be implemented in other network storage architectures including other SAN architectures. An exemplary SAN system in which client systems may directly access SAN storage for I/O operations, with I/O access control handled by a SAN direct access server, and in which embodiments of the mechanism for re-exporting mount points as described herein may be implemented, is described below.

SAN Direct Access System

In traditional storage architecture, each server is privately connected to one or more storage devices using SCSI or other storage interconnect technology. If a server is functioning as a file server, it can give other servers (its clients) on the network access to its locally attached files through the local area network. With a storage area network, storage devices are consolidated on their own high-speed network using a shared SCSI bus and/or a fibre channel switch/hub. A SAN is a logical place to host files that may be shared between multiple systems. This may potentially reduce traffic on the LAN if clients accessing shared files are able to get the data directly from the SAN itself, rather than through the server and over the LAN. Embodiments of a SAN direct access system as described herein makes this possible.

A shared storage environment, is one in which multiple servers may access the same set of data. A challenge with this architecture is to maintain consistency between file data and file system data. A common architecture for sharing file-based storage is the File Server architecture, for example, the SAN environment illustrated in FIG. 1. In the File Server architecture, one or more servers are connected to a large amount of storage (either attached locally or in a SAN) and provide other systems access to this storage. This architecture has a number of limitations for environments with escalating storage or performance requirements:

File-server performance becomes a gating factor because it must manage all requests for file access.

Because all data travels over the LAN, the file server and its network interfaces, the network can become a performance bottleneck. This is particularly true when the files involved—such as graphics, audio or multimedia files—are large or the volume of requests is high, such as a when a Web site experiences traffic peaks.

Web server installations attempt to solve the scalability problem by replicating the data on multiple servers, which introduces storage and management overhead.

This architecture does not leverage all the benefits of the SAN. Although data transfer between the SAN and the file server is fast, all data still travel from storage devices 104 to client systems 106 through a server 102 and over the potentially congested network 108 (e.g. a LAN). As increasing numbers of clients request data, performance may degrade rapidly.

Figure 7:
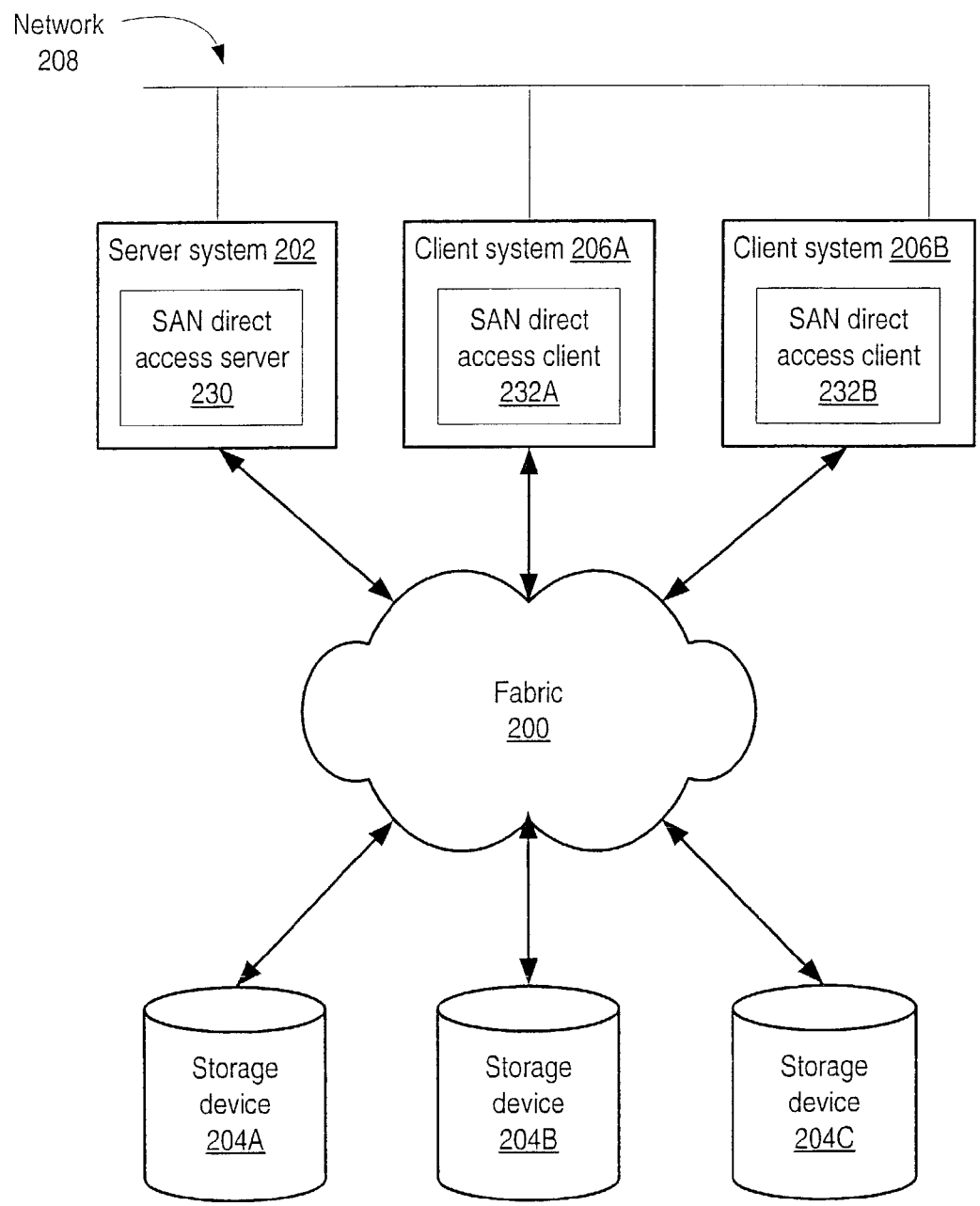
FIG. 7 illustrates an embodiment of a SAN direct access system with which embodiments of the mechanism for re-exporting NFS mount points may be used.

FIG. 7 illustrates a SAN direct access system according to one embodiment. Embodiments of the SAN direct access system may provide each client system 206 direct access to the data on storage devices 204 on the SAN. In one embodiment, a SAN direct access server 230 controls the access to ensure the integrity of the data. This architecture provides enhanced scalability and performance, while operating transparently to the client systems 206 accessing the data. Embodiments of the SAN direct access system may be used with a variety of operating systems, including, but not limited to, Microsoft's Windows 2000 and Windows XP operating systems. In one embodiment, the SAN direct access system may operate transparently to the users and applications accessing the shared data.

One embodiment of the SAN direct access system may include a server module (SAN direct access server 230) that may run on at least one server system 202 and that may act as a file server for the shared storage devices 204. One embodiment of the SAN direct access system may include one or more client modules 232 that may each run on a client system 206. Client systems 206 may include servers such as Web servers, NFS servers, as well as other systems. One embodiment may include a SAN direct access management console that may run on any server system 202, client system 206 or any other system on the network 208.

FIG. 7 shows an exemplary SAN direct access system with one SAN direct access server 230 and two clients SAN direct access clients 232. In one embodiment, SAN direct access clients 232 may be servers for other functions, such as NFS servers and/or Web servers. The SAN direct access server 230 "owns" the shared storage and manages access to the storage, and may appear to clients as a standard file server. However, in the SAN direct access system, SAN direct access clients 232 may access the shared storage directly once the SAN direct access server 230 has granted permissions. This results in less data traveling over the network 208 and the SAN direct access clients 232 receiving data at SAN speeds.

In one embodiment, the SAN direct access server 230 mounts the shared file system, manages space on the disk and controls access to files using standard Windows access and CIFS protocols. A SAN direct access client 232 may request access to a file managed by the SAN direct access server 230. When the SAN direct access server 230 grants access, it sends the disk addresses for the blocks. The SAN direct access client 232 reads disk blocks directly over the SAN fabric 200, bypassing the network 208 altogether. Thus, embodiments of the SAN direct access system may provide direct disk access to shared data. In one embodiment, the only traffic that travels over the network 208 between the SAN direct access server 230 and the SAN direct access client 232 are any messages needed to authenticate and grant access to the files and to provide the disk addresses to the SAN direct access client 232—the file system metadata. In one embodiment, the files themselves do not travel on the network 208. In one embodiment, an occasional file access may be made via the SAN direct access server 230 across the network 208 to ensure data integrity.

As an example of using an embodiment of the mechanism for re-exporting mount points in the SAN direct access system, one of the SAN direct access clients 232 may import a file system (which may be exported from another one of the SAN direct access clients 232 or from the SAN direct access server 230). The SAN direct access client 232 may then re-export the file system to another system coupled to network 208 that is not part of the SAN direct access system and that does not have a direct connection to fabric 200, and thus does not have direct access to the SAN. The other system may then access files in the file system using the embodiment of the mechanism for re-exporting mount points as described above.

Embodiments of the SAN direct access system may help prevent the network 208 from becoming congested. Embodiments of the SAN direct access servers 230 may process more client requests than standard file servers because they manage only the metadata instead of serving the data itself. This may reduce the I/O load on the SAN direct access servers 230 and thus may reduce or eliminate performance bottlenecks at the SAN direct access servers 230. Using the SAN direct access system, a SAN direct access client 232 may access the data at SAN speeds instead of network 208 speeds. Less data travels through the network 208 because the shared files themselves travel directly over the SAN to SAN direct access clients 232. Networks implementing the SAN direct access system may handle significantly more requests without adding hardware infrastructure.

Embodiments of the SAN direct access system may be scalable. In one embodiment, a SAN direct access system may include multiple SAN direct access clients 232 and SAN direct access servers 230. In one embodiment, the SAN direct access system supports a multiserver architecture, in which different SAN direct access servers 230 "own" and serve different shared data pools. Adding SAN direct access servers 230 may alleviate the server-based load and increase scalability. In one embodiment, additional SAN direct access clients 232 may be added. For example, using the SAN direct access system, a Web site may add Web servers to manage more requests. Each added Web server, as a SAN direct access client 232, requests the shared data from a SAN direct access server 230 and then accesses the data directly from the SAN using direct disk access. Each new SAN direct access client 232 may add only minor additional network 208 traffic because only the metadata requests travel on the network.

By supporting consolidated storage on a SAN, embodiments of the SAN direct access system may simplify overall storage management tasks. One embodiment may include a SAN direct access management console that may include a graphical user interface (GUI) for managing shared storage. From the console, a user may, for example, connect to the SAN direct access server(s) 230, assign storage to SAN direct access servers 230, and create export shares. In one embodiment, the user, from the console, may also connect to SAN direct access clients 232 and create import shares to make the shared storage available to the SAN direct access clients 232.

One embodiment of the SAN direct access system may also be compatible with failover clustering solutions, such as Microsoft Cluster Server (MSCS). In this embodiment, making a SAN direct access server 230 a node in a failover cluster may provide a high availability configuration for shared storage access. Additionally, One embodiment of the SAN direct access system may support SAN direct access servers 230 configured with a Cluster Server in either active/passive or active/active modes. The active/active configuration may allow for load balancing between SAN direct access servers 230 that are included in the cluster. This may enable high-performance file access in SANs from multiple nodes.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A storage area network (SAN), comprising:
one or more storage devices each comprising a plurality of files;
a plurality of servers each configured to provide access to the files on the storage devices to one or more client systems, wherein the plurality of servers comprises a first server, a second server, and a third server;
wherein the third server comprises a file system, and wherein the third server is configured to export the file system to the second server; and
wherein the second server is configured to:
re-export the file system to the first server;
receive a file handle lookup request for a file in the file system from the first server;
access the third server to generate a file handle for the file in the file system on the second server; and
send the file handle for the file in the file system on the second server to the first server.

2. The SAN as recited in claim 1, wherein, to access the third server to generate a file handle for the file in the file system on the second server, the second server is further configured to:
access the third server to generate a file system identifier and a file identifier for the file; and
generate the file handle for the file in the file system on the second server from the file system identifier and the file identifier.

3. The SAN as recited in claim 1,
wherein, to access the third server to generate a file handle for the file in the file system on the second server, the second server is further configured to:
send the file handle lookup request to the third server;
receive a file handle for the file in the file system on the third server from the third server; and
send the file handle for the file in the file system on the third server to the third server;
wherein the third server is configured to:
map the file handle for the file in the file system on the third server to a file system identifier and a file identifier for the file; and
send the file system identifier and the file identifier to the second server;
wherein, to access the third server to generate a file handle for the file in the file system on the second server, the second server is further configured to:
receive the file system identifier and the file identifier for the file from the third server; and
generate the file handle for the file in the file system on the second server from the file system identifier and the file identifier received from the third server.

4. The SAN as recited in claim 1, wherein the second server is further configured to:
receive an I/O request for the file from the first server, wherein the I/O request comprises the file handle for the file in the file system on the second server;
generate a file handle for the file in the file system on the third server from the file handle for the file in the file system on the second server received in the I/O request; and
forward the I/O request to the third server, wherein the I/O request comprises the file handle for the file in the file system on the third server.

5. The SAN as recited in claim 4,
wherein the third server is configured to send results of the I/O request to the second server; and
wherein the second server is further configured to forward the results to the first server.

6. The SAN as recited in claim 1,
wherein the second server is further configured to:
receive an I/O request for the file from the first server, wherein the I/O request comprises the file handle for the file in the file system on the second server;
extract a file system identifier and a file identifier from the file handle for the file in the file system on the second server; and
send the file system identifier and the file identifier to the third server;
wherein the third server is configured to:
map the file system identifier and the file identifier to a file handle for the file in the file system on the third server; and
send the file handle for the file in the file system on the third server to the second server;
wherein the second server is further configured to:
receive the file handle for the file in the file system on the third server from the third server; and
forward the I/O request to the third server, wherein the I/O request comprises the file handle for the file in the file system on the third server.

7. The SAN as recited in claim 1, wherein the plurality of servers are configured to provide access to the files on the storage devices in accordance with Network File System (NFS).

8. A system, comprising:
a processor; and
a memory comprising program instructions, wherein the program instructions are executable by the processor to:
re-export a file system imported from a server to a client, wherein said file system is exported from the server to the system;
receive a file handle lookup request for a file in the file system from the client;
access the server to generate a file handle for the file in the file system on the system; and
send the file handle for the file in the file system on the system to the server.

9. The system as recited in claim 8, wherein, to access the server to generate a file handle for the file in the file system on the system, the program instructions are further executable by the processor to:
access the server to generate a file system identifier and a file identifier for the file; and
generate the file handle for the file in the file system on the system from the file system identifier and the file identifier.

10. The system as recited in claim 8, wherein, to access the server to generate a file handle for the file in the file system on the system, the program instructions are further executable by the processor to:

send the file handle lookup request to the server;
receive a file handle for the file in the file system on the server from the server;
send the file handle for the file in the file system on the server to the server;
receive from the server a file system identifier and a file identifier generated by the server from the file handle for the file in the file system on the server; and
generate the file handle for the file in the file system on the system from the file system identifier and the file identifier received from the server.

11. The system as recited in claim 8, wherein the program instructions are further executable by the processor to:
receive an I/O request for the file from the client, wherein the I/O request comprises the file handle for the file in the file system on the system;
generate a file handle for the file in the file system on the server from the file handle for the file in the file system on the system received in the I/O request;
forward the I/O request to the server, wherein the I/O request comprises the file handle for the file in the file system on the server;
receive results of the I/O request from the server; and
forward the received results to the client.

12. The system as recited in claim 8, wherein the program instructions are further executable by the processor to:
receive an I/O request for the file from the client, wherein the I/O request comprises the file handle for the file in the file system on the system;
extract a file system identifier and a file identifier from the file handle for the file in the file system on the system;
send the file system identifier and the file identifier to the server;
receive from the server a file handle for the file in the file system on the server generated by the server from the file system identifier and the file identifier; and
forward the I/O request to the server, wherein the I/O request comprises the file handle for the file in the file system on the server.

13. The system as recited in claim 8, wherein the system, the server and the client are configured to provide access to files in the file system in accordance with Network File System (NFS).

14. A system, comprising:
a processor; and
a memory comprising program instructions, wherein the program instructions are executable by the processor to:
re-export a file system imported from a server to a client, wherein said file system is exported from the server to the system;
receive an I/O request for a file in the file system from the client, wherein the I/O request comprises a file handle for the file in the file system on the system;
access the server to generate a file handle for the file in the file system on the server from the file handle for the file in the file system on the system received in the I/O request; and
forward the I/O request to the server, wherein the I/O request comprises the file handle for the file in the file system on the server.

15. The system as recited in claim 14, wherein the program instructions are further executable by the processor to:
receive results of the I/O request from the server; and
forward the received results to the client.

16. The system as recited in claim 14, wherein, to access the server to generate a file handle for the file in the file system on the server from the file handle for the file in the file system on the system received in the I/O request, the program instructions are further executable by the processor to:
extract a file system identifier and a file identifier from the file handle for the file in the file system on the system;
send the file system identifier and the file identifier to the server; and
receive from the server a file handle for the file in the file system on the server generated by the server from the file system identifier and the file identifier.

17. The system as recited in claim 14, wherein the system, the server and the client are configured to provide access to the files in the file system in accordance with Network File System (NFS).

18. A computer-implemented method, comprising:
a system re-exporting a file system imported from a server to a client, wherein said file system is exported from the server to the system;
the system receiving a file handle lookup request for a file in the file system from the client;
the system accessing the server to generating a file handle for the file in the file system on the system; and
the system sending the file handle for the file in the file system on the system to the client.

19. The method as recited in claim 18, wherein the system accessing the server to generating a file handle for the file in the file system on the system comprises:
the system accessing the server to generate a file system identifier and a file identifier for the file; and
the system generating the file handle for the file in the file system on the system from the file system identifier and the file identifier.

20. The method as recited in claim 18, wherein the system accessing the server to generating a file handle for the file in the file system on the system comprises:
the system sending the file handle lookup request to the server;
the system receiving from the server a file handle for the file in the file system on the server;
the system sending to the server the file handle for the file in the file system on the server;
the server mapping the file handle for the file in the file system on the server to a file system identifier and a file identifier for the file;
the server sending the file system identifier and the file identifier to the system;
the system receiving the file system identifier and the file identifier for the file from the server; and
the system generating the file handle for the file in the file system on the system from the file system identifier and the file identifier received from the server.

21. The method as recited in claim 18, further comprising:
the system receiving an I/O request for the file from the client, wherein the I/O request comprises the file handle for the file in the file system on the system;
the system accessing the server to generate a file handle for the file in the file system on the server from the file handle for the file in the file system on the system received in the I/O request; and
the system forwarding the I/O request to the server, wherein the I/O request comprises the file handle for the file in the file system on the server.

22. The method as recited in claim 21, further comprising:
the system receiving results of the I/O request from the server; and
the system forwarding the received results to the client.

23. The method as recited in claim 18, further comprising:
the system receiving an I/O request for the file from the client, wherein the I/O request comprises the file handle for the file in the file system on the system;
the system extracting a file system identifier and a file identifier from the file handle for the file in the file system on the system;
the system sending the file system identifier and the file identifier to the server;
the server mapping the file system identifier and the file identifier to a file handle for the file in the file system on the server;
the server sending the file handle for the file in the file system on the server to the system;
the system receiving from the server the file handle for the file in the file system on the server; and
the system forwarding the I/O request to the server, wherein the I/O request comprises the file handle for the file in the file system on the server.

24. The method as recited in claim 18, wherein the system, the server and the client are configured to provide access to the files in the file system in accordance with the Network File System (NFS).

25. A computer-accessible storage medium comprising program instructions, wherein the program instructions are configured to cause a computer to implement:
a system re-exporting a file system imported from a server to a client, wherein said file system is exported from the server to the system;
the system receiving a file handle lookup request for a file in the file system from the client;
the system accessing the server to generating a file handle for the file in the file system on the system; and
the system sending the file handle for the file in the file system on the system to the client.

26. The computer-accessible medium as recited in claim 25, wherein, in the system accessing the server to generating a file handle for the file in the file system on the system, the program instructions are further configured to implement:
the system accessing the server to generate a file system identifier and a file identifier for the file; and
the system generating the file handle for the file in the file system on the system from the file system identifier and the file identifier.

27. The computer-accessible medium as recited in claim 25, wherein, in the system accessing the server to generating a file handle for the file in the file system on the system, the program instructions are further configured to implement:
the system sending the file handle lookup request to the server;
the system receiving from the server a file handle for the file in the file system on the server;
the system sending to the server the file handle for the file in the file system on the server;
the server mapping the file handle for the file in the file system on the server to a file system identifier and a file identifier for the file;
the server sending the file system identifier and the file identifier to the system;
the system receiving the file system identifier and the file identifier for the file from the server; and
the system generating the file handle for the file in the file system on the system from the file system identifier and the file identifier received from the server.

28. The computer-accessible medium as recited in claim 25, wherein the program instructions are further configured to implement:
the system receiving an I/O request for the file from the client, wherein the I/O request comprises the file handle for the file in the file system on the system;
the system accessing the server to generate a file handle for the file in the file system on the server from the file handle for the file in the file system on the system received in the I/O request;
the system forwarding the I/O request to the server, wherein the I/O request comprises the file handle for the file in the file system on the server;
the system receiving results of the I/O request from the server; and
the system forwarding the received results to the client.

29. The computer-accessible medium as recited in claim 25, wherein the program instructions are further configured to implement:
the system receiving an I/O request for the file from the client, wherein the I/O request comprises the file handle for the file in the file system on the system;
the system extracting a file system identifier and a file identifier from the file handle for the file in the file system on the system;
the system sending the file system identifier and the file identifier to the server;
the server mapping the file system identifier and the file identifier to a file handle for the file in the file system on the server;
the server sending the file handle for the file in the file system on the server to the system;
the system receiving from the server the file handle for the file in the file system on the server; and
the system forwarding the I/O request to the server, wherein the I/O request comprises the file handle for the file in the file system on the server.

30. The computer-accessible medium as recited in claim 25, wherein the system, the server and the client are configured to provide access to files in the file system in accordance with Network File System (NFS).

* * * * *